United States Patent
Dolinski et al.

[15] 3,666,727
[45] May 30, 1972

[54] POLYMERS OF HALOGEN CONTAINING N-ALKENYL CARBAMATES

[72] Inventors: Richard J. Dolinski; Robert M. Nowak, both of Midland; George A. Burk, Bay City, all of Mich.

[73] Assignee: The Dow Chemical Company, Midland, Mich.

[22] Filed: June 22, 1970

[21] Appl. No.: 48,485

[52] U.S. Cl. ...................................260/77.5 BB
[51] Int. Cl. .........................................C08g 22/04
[58] Field of Search ............................260/77.5 BB

[56] References Cited

UNITED STATES PATENTS 2,748,103   5/1956   Priest.....................................260/77.5
2,863,488   12/1958  Short et al. ............................260/77.5

Primary Examiner—Donald E. Czaja
Assistant Examiner—M. J. Welsh
Attorney—Griswold & Burdick, R. G. Waterman, L. J. Dankert and M. S. Jenkins

[57] ABSTRACT

Polymers of halogenated carbyl-N-alkenyl carbamates represented by the formula:

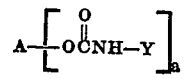

wherein A is halogenated carbyl such as haloalkyl or haloaryl, Y is alkenyl such as vinyl or allyl and $a$ is 1 or 2. Polymers of such carbamates and other ethylenically unsaturated monomers are generally found to be self-extinguishing.

14 Claims, No Drawings

POLYMERS OF HALOGEN CONTAINING N-ALKENYL CARBAMATES

BACKGROUND OF THE INVENTION

This invention relates to polymers of N-alkenyl carbamates containing halogen including fire resistant copolymers of such carbamates and other ethylenically unsaturated monomers.

Fire-resistant polymers which are useful in protective coatings and fabricated articles would be most desirable. Of particular interest would be copolymers containing large proportions of common monomers such as styrene and substituted styrenes which exhibit self-extinguishing characteristics yet which possess the physical characteristics of styrene-type polymers.

Heretofore it has been a common practice to render styrene polymers fire retardant by blending non-combustible additives, e.g., halogen containing additives, therewith. However, such additives are often non-permanent for the styrene polymers as they are readily extracted during most washing or similar such procedures carried out during fabrication.

These halogen-containing additives are thought to provide flameproofing properties by decomposing at elevated temperatures in the flame to produce hydrogen halide which extinguishes the flame. Unfortunately, many of such additives decompose and release hydrogen halide at temperatures substantially below the flame temperature of burning polymer. Since many plastic articles are produced by fabricating the polymer at an elevated temperature, the flame retarding additive previously incorporated into the polymer tends to undergo at least partial decomposition. As a result of this partial decomposition, hydrogen halide is released causing corrosion of the fabrication equipment. Corrosion inhibitors have been added to the polymer to combat this problem; however they have not been completely effective in this regard and their presence may adversely affect other properties of the polymer. In addition to the corrosion problem the breakdown of the halogenated compound usually produces discoloration of the finished plastic which is particularly undesirable in the case of transparent plastics such as polystyrene. A further problem is that of instability to light. Self-extinguishing plastic articles which are exposed to sunlight may become discolored as a result of the photochemical effects of the actinic rays on the halogenated compounds.

Therefore, it would be highly desirable to provide polymers which have permanent flame retarding characteristics and which do not undergo decomposition at temperatures employed to fabricate such polymers.

SUMMARY OF THE INVENTION

In accordance with the present invention polymers of halogenated carbyl-N-alkenyl carbamates are provided. More specifically the present invention involves polymers of halogenated carbyl-N-alkenyl carbamates represented by the general formula:

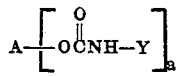

wherein A is haloalkyl, haloalkenyl, haloaryl, haloalkylene or haloarylene; Y is aliphatic group having a terminal double bond and a is one or two. Such polymers are found to be generally fire retardant and to be effective materials for protective coating and fabrication. In particularly important embodiments, this invention concerns copolymers of conventional ethylenically unsaturated monomers such as styrene or substituted styrenes and the above described carbamates. Such copolymers are generally self-extinguishing and usually possess physical properties such as strength and processability generally comparable with or better than homopolymers of the particular ethylenically unsaturated monomer. These copolymers are particularly useful in the fabrication of shaped articles and in other molding applications. Examples of uses include auto parts such as dash boards and kick panels, insulation for refrigerators and the like, housings for electrical appliances and many other applications requiring fire-retardant plastics.

DETAILED DESCRIPTION OF THE PREFERRED EMBODIMENTS

As more particularly defined, the polymerizable carbamates employed in the present invention are halogenated carbyl-N-alkenyl carbamates as represented by the formula:

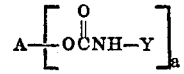

wherein a is 1 or 2 and A and Y are as defined hereinbefore and hereinafter.

Halogenated carbyl which corresponds to A is suitably haloalkyl having from two to eight carbon atoms, halo-alkenyl having from two to eight carbon atoms, haloaryl having from six to 16 carbon atoms, haloalkylene having from two to eight carbon atoms, or haloarylene having from six to 16 carbon atoms. Chlorine, bromine and iodine are suitable halogens, with bromine being preferred. To maximize the self-extinguishing characteristics of the resultant polymer, it is preferable that halogenated carbyl contain sufficient halogen atoms to provide a ratio of halogen atoms: carbon atoms in the carbamate of at least 1:4, especially 1:3 to 1:2. Advantageously halogenated carbyl is a mono or divalent radical represented by one of the following formulas:

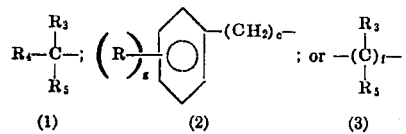

wherein R is halogen or haloalkyl; $R_3$, $R_4$ and $R_5$ are individually hydrogen, alkyl having from one to eight carbon atoms, alkenyl having from two to eight carbon atoms, aryl having from six to 16 carbon atoms, haloalkyl having from one to eight carbon atoms, haloalkenyl having from two to eight carbon atoms, or haloaryl having from six to 16 carbon atoms provided at least one of $R_3$ and $R_5$ contains halogen; $c$ is zero or a whole number from 1 to 6; $f$ is a whole number from 2 to 6, and $g$ is a whole number from 1 to 5. For the purposes of this invention the terms "haloalkyl," "haloalkenyl," "haloaryl," "haloalkylene" and "haloarylene" include both monohaloradicals and polyhaloradicals with polyhaloradicals generally having from 2 to 10 halogen atoms not necessarily of the same halogen.

Aliphatic groups having terminal double bonds which correspond to Y are suitably vinyl, allyl, isopropenyl, acryloyl, methacryloyl, ethacryloyl and other alkenyl groups having a terminal double bond. Preferably Y is an alkenyl group represented by the formula:

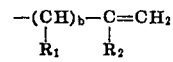

wherein $R_1$ and $R_2$ are individually hydrogen or alkyl having from one to six carbon atoms and $b$ is zero or a whole number from 1 to 6.

Polymerizable carbamates employed in this invention are readily prepared by reacting unsaturated isocyanates of the formula Y—NCO with alcohols of the formula: A—(OH)$_a$ wherein Y and A are as hereinbefore set forth.

Suitable isocyanates containing polymerizable vinyl group include vinyl isocyanate, allyl isocyanate, isopropenyl isocyanate, acryloyl, methacryloyl, and ethacryloyl isocyanates. Vinyl, isopropenyl and allyl isocyanates are readily prepared by the method described by D. Heinert in U.S. Pat. No. 3,470,228. Acryloyl, methacryloyl and ethacryloyl isocyanates can be prepared by the method described by Lieser and Kemmer in Chem. Berg. 84 4(1951). During preparation of the alkenyl isocyanate, it is desirable to employ a polymerization inhibitor in the reaction mixture. Exemplary of such inhibitors are hydroquinone, quinone, t-butyl-catechol and the like which are beneficially used in amounts of 0.05 to 0.2 weight percent based on the reaction mixture.

Alcohols corresponding to the formula A —(OH)$_a$ are readily available or can be easily prepared by conventional organic synthesis. Illustratively, however, tri-bromoneopentyl alcohol can be prepared by reacting pentaerythritol with hydrogen bromide in glacial acetic acid to produce a tribromopentaerythrityl acetate. The desired alcohol is then produced by transesterification of this product with methanol. Examples of suitable alcohols include tribromoneopentyl alcohol, 2,3-dibromopropyl alcohol, 2,3,3-tribromoallyl alcohol, 2,3,4,5,6-pentabromophenol, 2-bromoethyl alcohol, trichloroneopentyl alcohol, 2,2-bis(chloromethyl)-1,3-propanediol, 2,2-bis(bromomethyl)-1,3-propanediol, 2,2-bis(chloromethyl)butanol, 2,2-bis(bromomethyl)hexanol and corresponding alkanols and 1,3-propanediols having both chloromethyl and bromomethyl substituents.

In the preparation of the carbamate, the alkenyl isocyanate is advantageously added to the halogen-containing alcohol in an inert halohydrocarbon solvents such as chloroform or carbon tetrachloride and preferably in the presence of an organometallic catalyst such as dibutyl tin diacetate. Other materials known to catalyze the reaction of alcohols with isocyanates are also suitable. The order of addition is not particularly critical. However, the reaction is exothermic, therefore portionwise addition of one component to the other is generally desired in order to control the reaction temperatures. Reaction temperature is also not critical as it is found that the desired reaction proceeds at temperatures in the range from 0° to 150° C. Preferably, however, the reaction is carried out at ambient or near ambient temperatures, e.g., from 25° to 80° C. Since isocyanates react readily with water, the reaction is preferably conducted under essentially anhydrous conditions, i.e., not more than 1,000 ppm total of water present in the reaction mixture. This problem can be further alleviated by employing excess isocyanates which will react with any aqueous impurity. In addition, it is preferable to carry out the reaction of isocyanate with alcohol under substantially oxygen-free conditions. Molar ratio of isocyanate to alcohol may vary considerably, e.g., from 1.5:1 to 1:1. However, since the reaction is quantitative at 1:1, this ratio or ratios near 1:1 are preferred. When this reaction is carried out in a solvent, usually an inert halohydrocarbon mentioned before or inert hydrocarbon such as toluene or benzene is employed in sufficient amounts such that the resulting reaction mixture is stirrable. Typically one or two liters of solvent is sufficient if up to 1 gram mole of each reactant is employed.

The carbamates as described hereinbefore are readily homopolymerized in the presence of a free-radical generating catalyst such as azobisisobutyronitrile. The resultant homopolymers are similar to polystyrene and can be generally characterized and are useful in molding and other polymer shaping applications.

In addition these carbamates are readily copolymerized with other monoethylenically unsaturated comonomers under conditions similar to those employed in homopolymerization thereof to form polymers having significantly better fire resistance and equivalent or better physical characteristics than homopolymers of the particular ethylenically unsaturated monomer. Typical of monoethylenically unsaturated comonomers which can be copolymerized with the aforementioned carbamates are styrene and substituted styrenes such as α-methylstyrene, ar-methylstyrene, ar-t-butylstyrene, ar-chloro-, ar-bromo-, ar-dibromo-, ar-di-chloro- and ar-trifluoro-styrenes and the like; acrylates and methacrylates such as ethyl acrylate, ar-butyl acrylate, iso-butyl acrylate; methyl methacrylate and the like, acrylonitrile, methacrylonitrile, vinyl acetate, vinyl chloride, vinylidene chloride and the like. The amounts of ethylenically unsaturated comonomers employed with the carbamate will vary depending on the particular application desired. Generally, however, it is desirable to employ such comonomers in amounts ranging from 50 to 98 weight percent based on the copolymer. To realize significant improvement in fire resistance, the carbamate should be employed in amounts of at least 2 weight percent based on the copolymer, preferably at least 3 weight percent. It is understood that mixtures of two or more of the comonomers and/or mixtures of two or more carbamates may be employed in preparation of such copolymers.

If a substantially cross-linked polymer or copolymer is desired, a polyethylenically unsaturated polymerizable monomer can be added to the monomer mixture prior to polymerization. Polyethylenically unsaturated monomers suitable as crosslinking agents, usually in amounts up to 5 weight percent based on monomer mixture, include divinylbenzene, trivinylbenzene, divinylnaphthalene, glycoldiacrylates and dimethacrylates, divinoxyethane and trivinoxypropane and the like.

The aforementioned carbamates, alone or in admixture with other ethylenically unsaturated comonomers as set forth hereinbefore, are readily polymerized at ambient or near ambient temperatures and pressures with the aid of a free-radical generating catalyst. Polymerization is most suitably conducted, however, at temperatures in the range from about 60° to about 90° C. Free radical generating catalysts suitably employed include organic or inorganic peroxides such as diethyl peroxides, di-t-butyl peroxide, benzoyl peroxide, lauroyl peroxide, hydrogen peroxide, and the like; a salt of a peracid such as ammonium persulfate, sodium perborate, potassium percarbonate and the like; or active organic azo catalysts such as α, α-azobis(α, γ-di-methyl-valeronitrile, azobisisobutyronitrile and the like.

The following examples are given to illustrate the invention and should not be construed as limiting its scope. Unless otherwise indicated, all parts and percentages are by weight.

EXAMPLE 1

A 10-part portion of vinyl isocyanate containing trace amounts of dinitro-o-cresol is gradually added to 325 parts of tribromoneopentyl alcohol and 0.5 part of dibutyl tin diacetate dissolved in 240 parts of chloroform under a nitrogen atmosphere. The reaction temperature is maintained at 80° C or below for the reaction time of 24 hours. The white solid tribromoneopentyl-N-vinyl carbamate is recovered in ≈100 percent yield and recrystallized from n-hexane in 75 percent yield and is found to melt at 67°–68° C. and elemental analysis as follows:

|      | Found | Calculated |
|------|-------|------------|
| % C  | 25.0  | 24.3       |
| % H  | 3.3   | 3.55       |
| % N  | 3.7   | 3.55       |
| % Br | 60.4  | 60.8       |

A 17-g. portion (0.043 mole) of the recovered tribromoneopentyl-N-vinyl carbamate and 153 g. (1.47 moles) of styrene are added to a glass bomb with 0.85 g (0.5 percent) of azobisisobutyronitrile. The bomb is purged with nitrogen for 5 minutes, sealed and immersed in a constant temperature water bath at 60° C for 17 hours. The bomb is then opened and the contents are dissolved in benzene. The polymer is reprecipitated twice from methanol and dried in a vacuum oven at 65° C for 24 hours. Results of elemental analysis of the polymer are as follows:

|   | Found, % | Calculated for 10% Carbamate, % |
|---|----------|-------------------------------|
| C | 85.5     | 85.4                          |
| H | 7.3      | 7.2                           |
| N | 0.2      | 0.3                           |

| | | |
|---|---|---|
| Br | 6.3 | 6.3 |
| O | 0.71 | 0.8 |

Copolymer structure is confirmed by infrared spectral analysis. This copolymer is compression molded at ≈195° C into test bars (6 × ½ × ⅛ inch) which are subjected to the standard burn tests: Underwriter's Subject No. 94 test (UL-94) and ASTM D-635. The bars pass both tests with regard to self-extinguishing characteristics (Class II). A composition passes the Underwriter's test, i.e., is Class II self-extinguishing if less than 25 seconds are required for the flame to extinguish when a burning specimen of the melt is withdrawn from a flame.

Other copolymers of tribromoneopentyl-N-vinyl carbamate and styrene are prepared in manner similar to preceding procedures except that the proportions of the monomers are varied sufficiently to yield copolymer containing 1.5 percent, 2.1 percent, 3 percent and 6.8 percent of the carbamate. These copolymers are molded into test bars and subjected to the rigors of UL-94 and ASTM D-635. The copolymers containing 3 percent or more of the carbamate pass both tests whereas those containing 1.5 percent and 2.1 percent of the carbamate burned but at a much slower rate than polystyrene. All of the above copolymers have equivalent or better physical characteristics than polystyrene does.

EXAMPLE 2

A 10-part portion of tribromoneopentyl-N-vinyl carbamate and 90 parts of acrylonitrile are added to a glass bomb with 0.5 part of azobisisobutyronitrile. Copolymerization is effected under conditions employed in Example 1. The copolymer precipitates during copolymerization and the precipitate is collected by filtering and dried overnight at 35° C. Elemental and spectral analysis of the dried product indicate an acrylonitrile/tribromo-neopentyl-N-vinyl carbamate copolymer (92/8). The copolymer is molded into test bars, subjected to burn tests as described in Example 1 and found to be self-extinguishing.

EXAMPLE 3

2,3-Dibromopropyl-N-vinyl carbamate is prepared by reacting equimolar amounts of 2,3-dibromopropyl alcohol with vinyl isocyanate in chloroform by the procedure employed in Example 1. A white solid is obtained by recrystallization from n-hexane which has a melting point of 67°-68.5° C and elemental analysis as follows:

| | Found | Calculated |
|---|---|---|
| % C | 25.5 | 25.1 |
| % H | 3.3 | 3.14 |
| % N | 5.0 | 4.85 |
| % Br | 54.65 | 55.47 |

Spectral analysis confirms the structure of 2,3-dibromopropyl-N-vinyl carbamate.

A copolymer of this carbamate with styrene is prepared by the polymerization procedure of Example 1. The resulting copolymer is analyzed and found to contain ≈10 percent of the carbamate. Test bars (6 × ½ × ⅛ inch) of the copolymer are found to be fire retardant.

EXAMPLE 4

In a manner similar to the polymerization procedure described in Example 1, 2,3,4,5,6-pentabromo-N-vinyl carbamate is polymerized and recovered as a solid, thermoplastic material capable of being molded into a variety of shapes. Test bars (6 × ½ × ⅛ inch) of the polymer pass both UL-94 and ASTM D-635 tests for fire resistance properties.

EXAMPLE 5

In a manner similar to the polymerization procedure described in Example 1, a monomeric mixture of 10 parts of 2,3,3-tribromoallyl-N-vinyl carbamate, 70 parts of styrene and 10 parts of methyl methacrylate is polymerized and recovered as a solid, thermoplastic material capable of being molded into a variety of shapes. Test bars (6 × ½ × ⅛ inch) of the polymer pass both UL-94 and ASTM D-635 tests for fire resistance.

EXAMPLE 6

In a manner similar to Example 4, a mixture of 15 parts of bis(vinyl carbamate) corresponding to the formula:

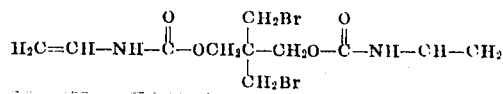

and 85 parts of styrene is polymerized, recovered and found to be fire resistant in accordance with UL-94 and ASTM D-635. The resulting copolymer is a thermoset resin.

What is claimed is:

1. A polymer of a halogenated carbyl-N-alkenyl carbamate represented by the formula:

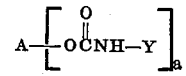

wherein A is a haloalkyl, haloalkenyl, haloaryl, haloalkylene or haloarylene; Y is an aliphatic group having a terminal double bond; and a is one or two, said polymer being polymerized through the terminal double bond.

2. The polymer according to claim 1 wherein the carbamate is represented by the formula:

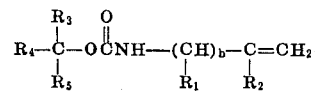

wherein $R_1$ and $R_2$ are individually hydrogen or alkyl having from one to six carbon atoms; $R_3$, $R_4$ and $R_5$ are individually hydrogen, alkyl or alkenyl having from one to eight carbon atoms, aryl having from six to 16 carbon atoms, haloalkyl or haloalkenyl having from one to eight carbon atoms and from one to eight halogen atoms, or haloaryl having from six to 16 carbon atoms provided at least one of $R_3$ and $R_5$ contains halogen and $b$ is zero or a whole number from 1 to 6, said polymer being formed by free radical catalysis.

3. The polymer according to claim 2 wherein the carbamate has at least one halogen atom per four carbon atoms.

4. The polymer according to claim 2 wherein the carbamate is represented by the formula:

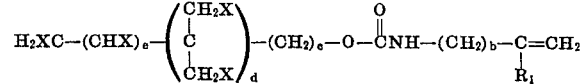

wherein $R_1$ is alkyl having one to three carbon atoms, X is halogen; b is 0 or 1; c, d, and e are individually 0, 1, 2, or 3.

5. The polymer according to claim 4 wherein the carbamate is tribromoneopentyl-N-vinyl carbamate.

6. The polymer according to claim 4 wherein the carbamate is 2,3-dibromopropyl-N-vinyl carbamate.

7. The polymer according to claim 1 wherein the carbamate is represented by the formula:

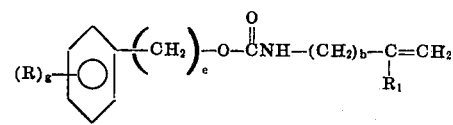

wherein $R_1$ is hydrogen or alkyl having from one to six carbon atoms; R is halogen or haloalkyl; $b$ is 0, 1, 2 or 3; $e$ is 0, 1, 2, 3 or 4; and $g$ is 1–5.

8. The polymer according to claim 7 wherein the carbamate is 2,3,4,5,6-pentabromophenyl-N-vinyl carbamate.

9. The polymer according to claim 1 wherein the carbamate is represented by the formula:

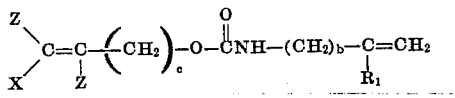

wherein $R_1$ is hydrogen or alkyl having 1 to 6 carbon atoms; Z is hydrogen or halogen; X is halogen; $b$ is 0, 1, 2 or 3; and $c$ is 1, 2, 3, or 4.

10. The polymer according to claim 9 wherein the carbamate is 2,3,3-tribromoallyl-N-vinyl carbamate.

11. The polymer according to claim 1 wherein the carbamate is represented by the formula:

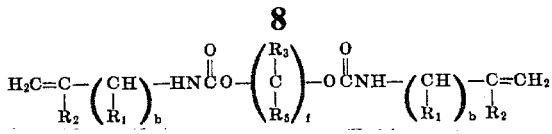

wherein $R_1$ and $R_2$ are individually hydrogen or alkyl having from one to eight carbon atoms; $R_3$ and $R_6$ are individually hydrogen, alkyl having from one to six carbon atoms, alkenyl having from two to eight carbon atoms, aryl having from six to 16 carbon atoms, haloalkyl having from one to eight carbon atoms, haloalkenyl having from two to eight carbon atoms, or haloaryl having from six to 16 carbon atoms with the proviso that at least one of $R_3$ and $R_6$ contains halogen; $b$ is 0 or a whole number from 1 to 6 and $f$ is a whole number from 1 to 6.

12. The polymer according to claim 1 wherein the carbamate, as defined in claim 1, is copolymerized with an ethylenically unsaturated monomer.

13. The polymer according to claim 12 wherein the ethylenically unsaturated monomer is styrene.

14. A self-extinguishing copolymer according to claim 13 wherein from about 3 to about 50 weight percent of tribromoneopentyl-N-vinyl carbamate is copolymerized with from about 97 to about 50 weight percent of styrene.

* * * * *